(12) United States Patent
Murata et al.

(10) Patent No.: US 10,061,156 B2
(45) Date of Patent: Aug. 28, 2018

(54) DISPLAY DEVICE

(71) Applicant: Sharp Kabushiki Kaisha, Sakai, Osaka (JP)

(72) Inventors: Mitsuhiro Murata, Sakai (JP); Takeshi Ishida, Sakai (JP); Ryuzo Yuki, Sakai (JP); Hirotoshi Yasunaga, Sakai (JP)

(73) Assignee: Sharp Kabushiki Kaisha, Sakai (JP)

(*) Notice: Subject to any disclaimer, the term of this patent is extended or adjusted under 35 U.S.C. 154(b) by 54 days.

(21) Appl. No.: 15/510,243

(22) PCT Filed: Aug. 31, 2015

(86) PCT No.: PCT/JP2015/074699
§ 371 (c)(1),
(2) Date: Mar. 10, 2017

(87) PCT Pub. No.: WO2016/039210
PCT Pub. Date: Mar. 17, 2016

(65) Prior Publication Data
US 2017/0261810 A1    Sep. 14, 2017

(30) Foreign Application Priority Data

Sep. 12, 2014 (JP) ................................ 2014-186006

(51) Int. Cl.
*G02F 1/1335*    (2006.01)
*G02F 1/1345*    (2006.01)
(Continued)

(52) U.S. Cl.
CPC ...... *G02F 1/133553* (2013.01); *G02F 1/1368* (2013.01); *G02F 1/13454* (2013.01);
(Continued)

(58) Field of Classification Search
None
See application file for complete search history.

(56) References Cited

U.S. PATENT DOCUMENTS

2005/0168678 A1* 8/2005 Andou ............. G02F 1/133514
349/145
2010/0225857 A1* 9/2010 Lu ..................... G02F 1/133555
349/98
(Continued)

FOREIGN PATENT DOCUMENTS

JP    2002-156628 A    5/2002

*Primary Examiner* — Ryan Crockett
(74) *Attorney, Agent, or Firm* — Keating & Bennett, LLP

(57) ABSTRACT

Provided is a technique for controlling the hue of an image when the image is displayed on a display panel so that the image should not be displayed with a hue different from the actual hue. The display device includes a display panel that includes an active matrix substrate 11a and a counter substrate 11b, and a reflection unit 12. The active matrix substrate 11a includes gate lines and source lines 24, and includes a plurality of pixel areas that are defined by the gate lines and the source lines 24. The counter substrate 11b includes color filters 31R, 31G, 31B of R, G, B at positions corresponding to the pixel areas. The reflection unit 12 transmits light from the light source 14, and reflects light from the active matrix substrate 11a. The pixel areas of R, G, B have reflection areas that reflect light from the reflection unit 12 so that the respective amounts of light outgoing from the above-described pixel areas are approximately uniform.

6 Claims, 13 Drawing Sheets

(51) Int. Cl.
*G02F 1/1362* (2006.01)
*G02F 1/1368* (2006.01)

(52) U.S. Cl.
CPC .. *G02F 1/133514* (2013.01); *G02F 1/136286* (2013.01); *G02F 2201/40* (2013.01); *G02F 2201/52* (2013.01)

(56) References Cited

U.S. PATENT DOCUMENTS

| | | | |
|---|---|---|---|
| 2014/0192515 A1* | 7/2014 | Kim, II | G02F 1/133512 362/97.1 |
| 2016/0170129 A1* | 6/2016 | Xu | G02F 1/133553 349/42 |
| 2016/0372045 A1* | 12/2016 | Hwang | G09G 3/3208 |
| 2017/0269425 A1* | 9/2017 | Nakagawa | G02F 1/133345 |
| 2017/0307917 A1* | 10/2017 | Kim | G02F 1/13363 |

* cited by examiner

| Laminate film (Cu/Ti) | Pixel area (R) | Pixel area (G) | Pixel area (B) | W |
|---|---|---|---|---|
| Aperture ratio | 60% | 60% | 60% | 60% |
| Light-shielding ratio (Metal electrode) | 40% | 40% | 40% | 40% |
| Amount of transmitted light | 60% | 60% | 60% | 60% |
| Amount of reflected light | 15% | 9% | 8% | 11% |
| Amount of synthetic light | 75% | 69% | 68% | 71% |

Fig. 7A

| Laminate film (Cu/Ti) | Pixel area (R) | Pixel area (G) | Pixel area (B) | W |
|---|---|---|---|---|
| Aperture ratio | 53% | 59% | 60% | 57% |
| Light-shielding ratio (Metal electrode) | 47% | 41% | 40% | 43% |
| Amount of transmitted light | 53% | 59% | 60% | 57% |
| Amount of reflected light | 15% | 9% | 8% | 11% |
| Amount of synthetic light | 68% | 68% | 68% | 68% |

Fig. 7B

| Laminate film (Cu/Ti) | Pixel area (R) | Pixel area (G) | Pixel area (B) | W |
|---|---|---|---|---|
| Aperture ratio | 54% | 60% | 61% | 58% |
| Light-shielding ratio (Metal electrode) | 46% | 40% | 39% | 42% |
| Amount of transmitted light | 54% | 60% | 61% | 58% |
| Amount of reflected light | 15% | 9% | 8% | 11% |
| Amount of synthetic light | 69% | 69% | 69% | 69% |

Fig. 7C

| Laminate film (Cu/Ti) | Pixel area (R) | Pixel area (G) | Pixel area (B) | W |
|---|---|---|---|---|
| Aperture ratio | 60% | 66% | 67% | 58% |
| Light-shielding ratio (Metal electrode) | 40% | 34% | 33% | 42% |
| Amount of transmitted light | 60% | 66% | 67% | 58% |
| Amount of reflected light | 15% | 9% | 8% | 11% |
| Amount of synthetic light | 75% | 75% | 75% | 75% |

| Aperture ratio (R,B) | Brightness (W) |
|---|---|
| 100% | 4.489 |
| 90% | 4.393 |
| 80% | 4.281 |
| 70% | 4.150 |

DISPLAY DEVICE

TECHNICAL FIELD

The present invention relates to a display device.

BACKGROUND ART

JP-A-2002-156628 discloses a plasma liquid crystal display device as a transmission-type display. The plasma liquid crystal display device includes a plurality of openings for displaying an image by transmitting or cutting off illumination light emitted from a light source, and a reflection layer made of aluminum or the like for reflecting light toward the light source side, the reflection layer being arranged at positions corresponding to a black mask that defines the openings. By proving the reflection layer at positions corresponding to the black mask, part of the illumination light is reflected to the light source side, and is reflected by the light source, whereby the light again enters to the openings. As a result, the amount of light entering to the openings increases, and the efficiency of utilization of the illumination light is improved.

SUMMARY OF THE INVENTION

Incidentally, in a liquid crystal display device in which a reflection layer formed with a dielectric mirror or the like is provided between the display panel and the light source, part of the light emitted from the light source passes through the openings of the pixel of R(red), G(green), B(blue) in the display panel and outgoes to the display surface side, but the other part of light is reflected by metal electrodes such as gate lines and source lines, and is incident on the reflection layer. The light incident on the reflection layer is reflected by the reflection layer, again enters the pixels, and passes through the openings of the pixels, thereby outgoing to the display surface side.

In a case where the metal electrodes such as the gate line and the source lines have different reflectances in the respective wavelength ranges of R, G, and B, the amounts of the reflected light that again enter the pixels of R, G, and B vary. If the aperture ratios of the pixels of R, G, B are uniform, the amounts of light outgoing from the respective pixels are different, and the image is displayed with a hue different from the actual hue.

It is an object of the present invention to provide a technique for controlling the hue of an image when the image is displayed on a display panel so that the image should not be displayed with a hue different from the actual hue.

A display device according to the present invention includes: a display panel that includes an active matrix substrate and a counter substrate, the active matrix substrate including gate lines and source lines, as well as a plurality of pixel areas defined by the gate lines and the source lines, and the counter substrate including color filters of R (red), G (green), and B (blue) at positions corresponding to the pixel areas, respectively; and a reflection unit that allows light emitted from a light source to pass therethrough so as to be projected to the active matrix substrate, and reflects light from the active matrix substrate toward the active matrix substrate, wherein the pixel areas have reflection areas that reflect light from the reflection unit so that respective amounts of light outgoing from the pixel areas corresponding to the color filter of R (red), G (green), and B (blue) are approximately uniform.

With the configuration of the present invention, the hue of an image can be controlled when the image is displayed on a display panel so that the image should not be displayed with a hue different from the actual hue.

BRIEF DESCRIPTION OF DRAWINGS

FIG. 7A illustrates the respective amounts of light in the pixel areas of R, G, B in a case where the aperture ratio is set so as to be equal to that in the pixel area of B illustrated in FIG. 6.

FIG. 7B illustrates the respective amounts of light in the pixel areas of R, G, B in a case where the aperture ratio is set so as to be equal to that in the pixel area of G illustrated in FIG. 6.

FIG. 7C illustrates the respective amounts of light in the pixel areas of R, G, B in a case where the aperture ratio is set so as to be equal to that in the pixel area of R illustrated in FIG. 6.

MODE FOR CARRYING OUT THE INVENTION

Figure 1:
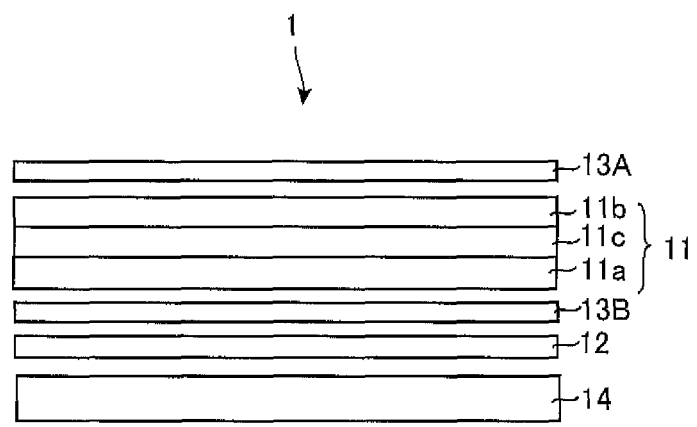
FIG. 1 is a schematic diagram illustrating a schematic configuration of a liquid crystal display device according to Embodiment 1.

A display device according to one embodiment of the present invention includes: a display panel that includes an active matrix substrate and a counter substrate, the active matrix substrate including gate lines and source lines, as well as a plurality of pixel areas defined by the gate lines and the source lines, and the counter substrate including color filters of R (red), G (green), and B (blue) at positions corresponding to the pixel areas, respectively; and a reflection unit that allows light emitted from a light source to pass therethrough so as to be projected to the active matrix substrate, and reflects light from the active matrix substrate toward the active matrix substrate, wherein the pixel areas have reflection areas that reflect light from the reflection unit so that respective amounts of light outgoing from the pixel areas corresponding to the color filter of R (red), G (green), and B (blue) are approximately uniform (the first configuration).

According to the first configuration, the display device includes a display panel and a reflection unit. The display panel includes gate lines and source lines in the active matrix substrate, and has a plurality of pixel areas corresponding to the color filters of R (red), G (green), and B (blue) in the counter substrate. The reflection unit allows light emitted from a light source to be projected to the active matrix substrate, and reflects light from the active matrix substrate toward the active matrix substrate. Each pixel area has a reflection area that reflects light from the reflection unit. A part of the light incident on the pixel area is reflected by the reflection area, and rest of the light outgoes through a part other than the reflection area. The reflection areas are determined so that the amounts of light outgoing through the pixel areas corresponding to the color filters of R, G, B are approximately uniform. Therefore, as compared with a case where a reflection area is not provided so that the amounts of light outgoing from the pixel areas of R, G, B are approximately uniform, the variation of the amounts of light outgoing from the pixel areas is reduced, whereby changes in the hue when an image is displayed can be reduced.

The second configuration may be the first configuration in which the source lines are provided in at least part of the reflection areas, and respective areas occupied by the source lines in the pixel areas corresponding to the color filters of R (red), G (green), and B (blue), respectively, are different from one another.

According to the second configuration, the areas of the source lines in the pixel areas of R, G, B can be made different, whereby the amounts of light outgoing to the pixel areas can be made uniform.

The third configuration may be the first or second configuration in which the gate lines are provided in at least part of the reflection areas, and respective areas occupied by the gate lines in the pixel areas corresponding to the color filters of R (red), G (green), and B (blue), respectively, are different from one another.

According to the third configuration, the areas of the gate lines in the pixel areas of R, G, B are made different, whereby the amounts of light outgoing to the pixel areas can be made uniform.

The fourth configuration may be any one of the first to third configurations in which the active matrix substrate further includes driving circuit units provided with respect to the gate lines, respectively, each driving circuit unit including a switching element that switches the gate line to a selected state or a non-selected state, and a control line that supplies a control signal to the switching element, and at least either the switching elements or the control lines are provided in at least part of the reflection areas in the pixel areas corresponding to the color filters of one color among the colors of R (red), G (green), and B (blue).

According to the fourth configuration, in at least part of the reflection area in the pixel area corresponding to the color filter of one color among the colors of R (red), G (green), and B (blue), at least either a switching element that switches the gate line to a selected state or a non-selected state, or a control line that supplies a control signal to the switching element, is arranged. In a case where the reflectance of the reflection areas with respect to the one color is higher than the reflectance thereof with respect to another color, at least either the switching elements or the control lines are arranged in at least part of the reflection areas of the pixel areas corresponding to the one color. By doing so, without decreases in the transmittance of the display panel as a whole, the amount of light outgoing from each pixel area can be adjusted.

The fifth configuration may be any one of the first to third configurations in which the active matrix substrate further includes: driving circuit units provided with respect to the gate lines, respectively, each driving circuit unit including a switching element that switches the gate line to a selected state or a non-selected state, and a control line that supplies a control signal to the switching element; and adjustment lines for adjusting aperture ratios of the pixel areas, wherein at least one among the switching elements, the control lines, or the adjustment lines are provided in at least part of the reflection areas, and in the pixel areas respectively corresponding to the color filters of R (red), G (green), and B (blue), respective areas occupied by the at least one among the switching elements, the control lines, or the adjustment lines are different from one another.

According to the fifth configuration, at least one among the switching elements that switch the gate line to a selected state or a non-selected state, the control lines that supply a control signal to the switching elements, and adjustment lines for adjusting the aperture ratios of the pixel areas, is arranged in at least part of the reflection areas of the pixel areas. In the pixel areas of R, G, B, respective areas occupied by the at least one among the switching elements, the control lines, or the adjustment lines are different from one another, whereby the amounts of light outgoing from the pixel areas of R, G, B can be made uniform. Further, by arranging the driving circuits in the pixel areas, the frame can be formed narrower, as compared with a case where the driving circuits are arranged outside the pixel areas.

The sixth configuration may be any one of the first to fourth configurations in which the reflection areas are formed with a metal film containing copper (Cu), and a ratio of an area occupied by the reflection area in the pixel area corresponding to the color filter of R (red) is greater than a ratio of an area occupied by the reflection area in the pixel area corresponding to the color filter of another color.

Copper has a greater reflectance with respect to a wavelength component of R, as compared with reflectances thereof with respect to wavelength components of G and B. Therefore, in a case where a metal film containing copper is used in the reflection areas, light reflected by the reflection areas contains the wavelength component of R at a greater ratio. This causes the amount of light that is reflected by the reflection areas and passes through the color filters of R is greater than the amount of light that passes through another color filter, and an image is displayed in a reddish color. According to the sixth configuration, the reflection area in the pixel area corresponding to the color filter of R is larger than the reflection area in the pixel area corresponding to the color filter of another color, and hence, the aperture ratio of the pixel area corresponding to the color filter of R is smaller than the aperture ratio of the pixel area corresponding to the color filter of another color. As a result, the amounts of light outgoing from the respective pixel areas are made uniform, whereby display of an image having a more reddish tone than an actual image can be avoided.

The following describes embodiments of the present invention in detail, while referring to the drawings. Identical or equivalent parts in the drawings are denoted by the same reference numerals, and the descriptions of the same are not repeated.

Embodiment 1

(Configuration of Liquid Crystal Display Device)

FIG. 1 is a schematic diagram illustrating a schematic configuration of a liquid crystal display device according to the present embodiment. The liquid crystal display device 1 includes a display panel 11, a reflection unit 12, polarizing plates 13A, 13B, and a light source 14.

The display panel 11 includes an active matrix substrate 11a, a counter substrate 11b, and a liquid crystal layer 11c interposed between these substrates.

The reflection unit 12 is provided between the active matrix substrate 11a and the light source 14. The reflection unit 12 includes a dielectric multilayer film. The reflection unit 12 transmits light emitted from the light source 14, and reflects light reflected by the active matrix substrate 11a.

The polarizing plate 13B polarizes light from the reflection unit 12 and allows the same to outgo toward the active matrix substrate 11a side. The polarizing plate 13A polarizes light that has passed through the counter substrate 11b, and allows the same to outgo toward the side of the display surface of the liquid crystal display device 1.

The light source 14 includes a light emitting element such as an LED. The light source 14 diffuses light of the light emitting element that is emitted by a light emission control device that is not illustrated, and projects the light to the active matrix substrate 11a via the reflection unit 12.

Next, the following description describes details of the display panel 11. The active matrix substrate 11a includes a plurality of gate lines 22 (see FIG. 2) and a plurality of source lines 24 (see FIG. 2), and have a plurality of pixel areas defined by the gate lines 22 and the source lines 24.

Figure 2:
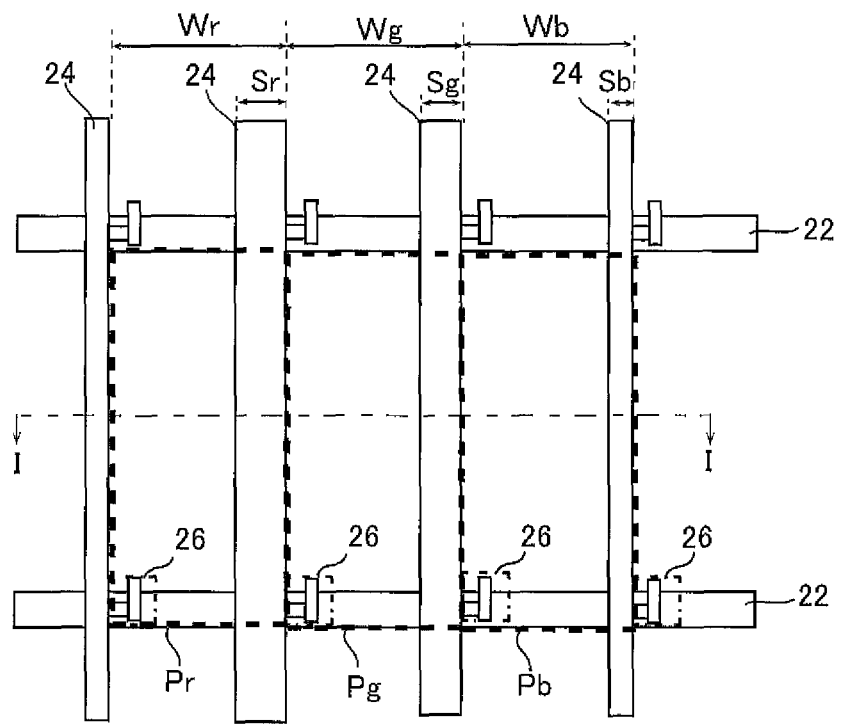
FIG. 2 is a schematic diagram illustrating a schematic configuration of an active matrix substrate illustrated in FIG. 1.

FIG. 2 is a schematic diagram illustrating a surface of some pixel areas in the active matrix substrate 11a. The pixel areas Pr, Pg, Pb illustrated in FIG. 2 display colors of R(red), G(green), B(blue) of color filters 31 provided in the counter substrate 11b, which is described below. In other words, the pixel area Pr corresponds to the color filter of R in the counter substrate 11b, the pixel area Pg corresponds to the color filter of G, and the pixel area Pb corresponds to the color filter of B.

As illustrated in FIG. 2, each of the pixel areas Pr, Pg, Pb includes a thin film transistor (TFT) 26 connected to one gate line 22 and one source line 24 that define the pixel area. Though the illustration is omitted, each gate line 22 is connected with a driving circuit that switches the gate line 22 to a selected state or a non-selected state, and in a state where the gate line 22 is selected, the TFT 26 is switched to an ON state, whereby a pixel electrode 28 (see FIG. 3) in the pixel area is driven.

Further, the widths Wr, Wg, Wb of the pixel areas Pr, Pg, Pb in the direction in which the gate line 22 extends are approximately uniform as illustrated in FIG. 2. Further, the width Sr of the source line 24 as a boundary between the pixel areas Pr, Pg, the width Sg of the source line 24 as a boundary between pixel areas Pg, Pb, and the width Sb of the source line 24 as a boundary between the pixel areas Pb, Pr satisfy the relation of Sr>Sg>Sb.

Figure 3:
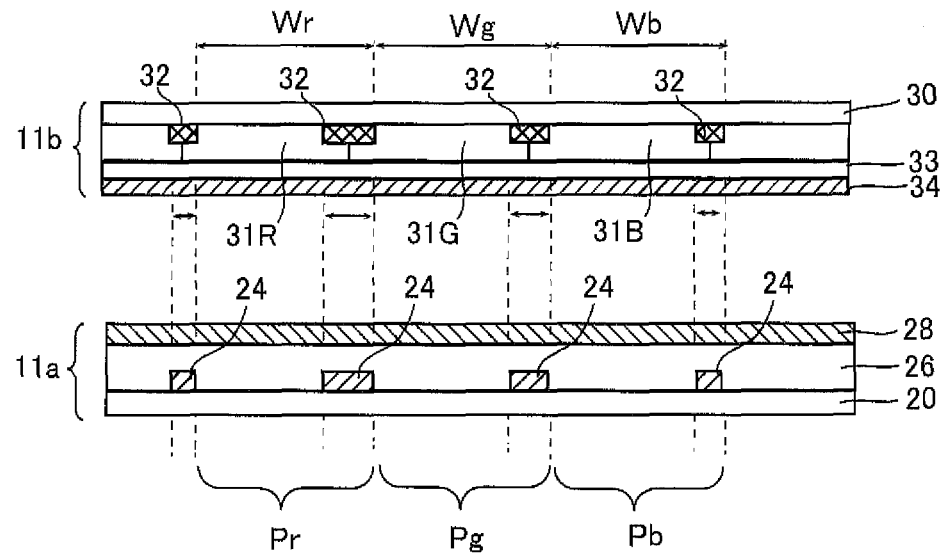
FIG. 3 is a schematic diagram illustrating a cross section of the active matrix substrate illustrated in FIG. 2, taken along a line I-I, and a cross section of a counter substrate corresponding thereto.

FIG. 3 is a schematic diagram illustrating a cross section of the active matrix substrate 11a illustrated in FIG. 2 taken along line I-I, and a cross section of the counter substrate 11b at a position corresponding to the foregoing cross section of the active matrix substrate 11a.

As illustrated in FIG. 3, the active matrix substrate 11a has the following configuration: the source lines 24 are formed on a substrate 20 made of a material having transparency such as glass, a protection film 26 is formed so as to cover the source lines 24, and a pixel electrode layer 28 formed with transparent conductive films made of ITO or the like is formed on the protection film 26.

Further, the counter substrate 11b has the following configuration: on a substrate 30 made of a material having transparency such as glass, at positions corresponding to the source lines 24 on the active matrix substrate 11a, a black matrix 32 having approximately the same width as that of the source line 24 is formed. The color filters 31R, 31G, 31B of R, G, B are formed on the substrate 30, between portions of the black matrix 32. An overcoat layer 33 is formed so as to cover the black matrix 32 and the color filters 31R, 31G, 31B, and a common electrode 34 formed with a transparent conductive film made of ITO or the like is formed on the overcoat layer 33.

In the present embodiment, the gate lines 22 and the source lines 24 are formed with metal films that contain copper (Cu). Gate terminals, source terminals, and drain terminals of the TFTs 26 (see FIG. 2) are formed with the same metal films as those of the gate lines 22 and the source lines 24. The areas where the metal electrodes formed with these metal films are arranged are reflection areas that reflect light.

Figure 4:
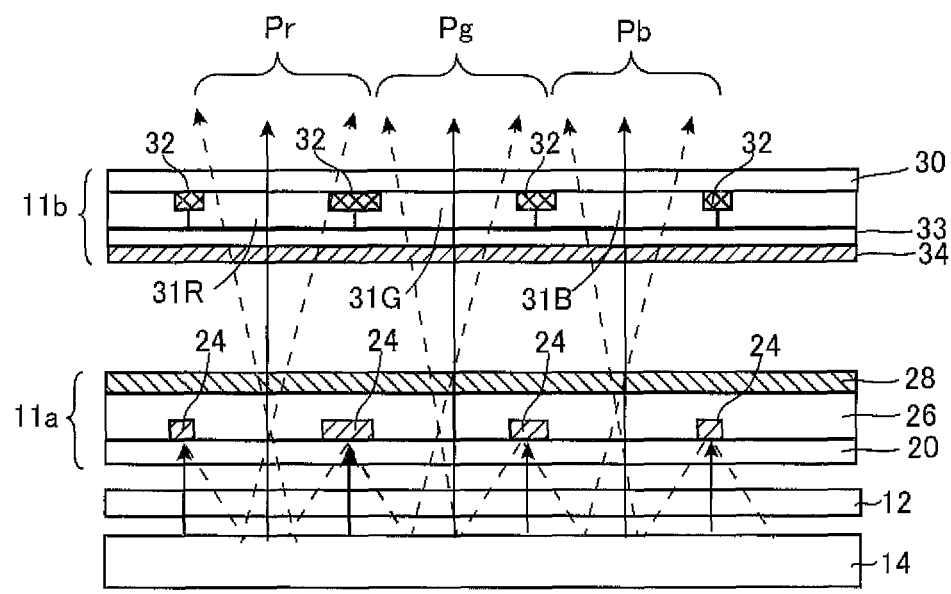
FIG. 4 is a schematic diagram illustrating exemplary light paths in the active matrix substrate and the counter substrate illustrated in FIG. 3.

Here, the following description describes a light path of light projected to the display panel 11. FIG. 4 is a schematic diagram illustrating a light path of light emitted from the light source 14. In FIG. 4, for convenience sake, the illustration of the liquid crystal layer 11c is omitted.

Solid line arrows in FIG. 4 indicate light that is emitted from the light source 14 and passes through the reflection unit 12. As illustrated in FIG. 4, a part of the light emitted from the light source 14 and passes through the reflection unit 12 enters the pixel areas Pr, Pg, Pb in the active matrix substrate 11a, and passes through a liquid crystal layer 12c (see FIG. 1) and the color filters 31R, 31G, 31B of the counter substrate 11b.

On the other hand, as indicated by broken line arrows in FIG. 4, of the light that has passed through the reflection unit 12, light reflected by the reflection areas (light-shielding areas) where the metal electrodes such as the source lines 24 are arranged is incident on the reflection unit 12 and is reflected by the reflection unit 12. The light enters the pixel areas Pr, Pg, Pb in the active matrix substrate 11a again. The part of the reflected light that again enters the pixel areas Pr, Pg, Pb passes through the transmission areas in the pixel areas Pr, Pg, Pb, and passes through the color filters 31R, 31G, 31B of the counter substrate 11b.

In other words, light entering the color filters 31R, 31G, 31B is light composed of the following: transmitted light that passes through the reflection unit 12 and directly enters the color filters 31R, 31G, 31B; and reflected light that is reflected in the reflection area, and thereafter is reflected by the reflection unit 12 and again enters the color filters 31R, 31G, 31B (hereinafter, this light is referred to as synthetic light). Each of the pixel areas Pr, Pg, Pb has a reflection area where a metal electrode is arranged, that is, light from the light source 14 is reflected, and a transmission area (opening) that allows light to pass therethrough.

Figures 5, 6:
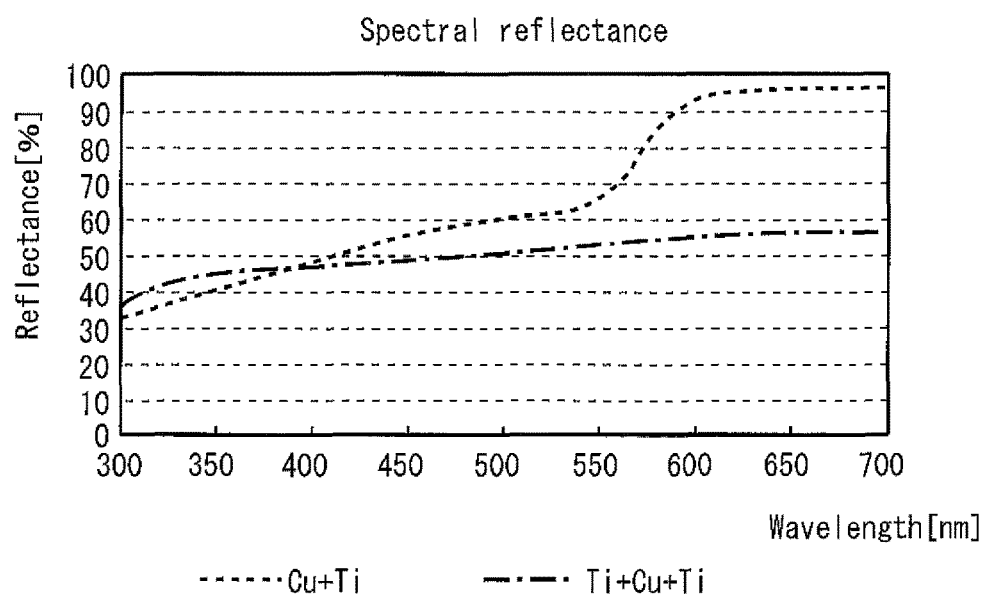
FIG. 5 illustrates reflectances of a laminate film (Cu/Ti) and a laminate film (Ti/Cu/Ti).
FIG. 6 illustrates respective amounts of light at pixel areas of R, G, B in a case where aperture ratios are uniform.

In the case where the metal electrodes have different reflectances in the wavelength ranges of R, G, B, the respective amounts of the reflected light from the pixel areas R, G, B in the active matrix substrate 11a entering the color filters 31R, 31G, 31B in the counter substrate 11b are different. Here, FIG. 5 shows reflectances of a laminate film (Cu/Ti) of copper (Cu) and titanium (Ti), and a laminate film (Ti/Cu/Ti) obtained by laminating titanium (Ti), copper (Ti), and titanium (Ti) in this order. In FIG. 5, the reflectance of the laminate film (Cu/Ti) is indicated by the broken line, and the reflectance of the laminate film (Ti/Cu/Ti) is indicated by the dashed dotted line.

As illustrated in FIG. 5, the laminate film (Ti/Cu/Ti) has a reflectance of about 50% in the wavelength range in the vicinities of 450 nm, a reflectance of about 53% in the wavelength range in the vicinities of 550 nm, and a reflectance of about 57% in the wavelength range in the vicinities of 650 nm. Further, the laminate film (Cu/Ti) has a reflectance of about 55% in the wavelength range in the vicinities of 450 nm, a reflectance of about 60% in the wavelength range in the vicinities of 550 nm, and a reflectance of about 95% in the wavelength range in the vicinities of 650 nm. Thus, FIG. 5 shows that the laminate film containing copper (Cu) has different reflectances in the wavelength ranges of R, G, B.

FIG. 6 shows light-shielding ratios, the amounts of transmitted light, the amounts of reflected light, and the amounts of synthetic light in the pixel areas of R, G, B, in a case where the source lines 24 are formed with the laminate films (Cu/Ti), and the aperture ratios of the pixel areas of R, G, B are set to be uniform (60%). "W" in FIG. 6 indicates a mean value of each of the foregoing values at the pixel areas of R, G, B.

The amounts of the transmitted light in the pixel areas of R, G, B in FIG. 6 are approximately equivalent to the aperture ratios in the pixel areas, and are considered to be the same values as the aperture ratios. The light-shielding ratio in each pixel area (metal electrode) indicates a ratio of the metal electrode in the pixel area, and can be expressed as "(100 minus aperture ratio)". Further, the amount of reflected light in each pixel area is calculated by the following formula (1):

Amount of reflected light=light-shielding ratio×reflectance×transmittance of polarizing plate×aperture ratio (1)

In this example, the calculation by the formula (1) is performed by assuming that the transmittance of the reflection unit 12 is 80% and that of the polarizing plate 13 is 80%, as well as assuming "polarizing plate transmittance=0.82". Further, the reflectance in the formula (1) is a reflectance with respect to a wavelength component that passes through the color filter corresponding to the pixel area, and the reflectances in the vicinities of 650 nm, in the vicinities of 550 nm, and in the vicinities of 450 nm illustrated in FIG. 5 are used. In other words, in the case of the pixel area of R, since the wavelength component of R passes through the color filter 31R, "95%" is used as the reflectance. In the case of the pixel area of G, since the wavelength component of G passes through the color filter 31G, "60%" is used as the reflectance. In the case of the pixel area of B, since the wavelength component of B passes through the color filter 31B, "55%" is used as the reflectance.

The amounts of synthetic light in the pixel areas of R, G, B in FIG. 6 are calculated by adding the amount of transmitted light and the amount of reflected light.

Since the reflectance of the wavelength component of R is higher than the reflectance of the wavelength component of G or B as illustrated in FIG. 5, the amounts of reflected light in the pixel areas of R, G, B satisfy the relation of R>G>B, as illustrated in FIG. 6. In the case where, therefore, the aperture ratios of the pixel areas of R, G, B are uniform, the amount of synthetic light in the pixel area of R is greater as compared with those of the synthetic light of the pixel areas of the other colors, the hue changes due to the reddish tone.

In the present embodiment, the hue is adjusted by adjusting the respective aperture ratios of the pixels so that the respective amounts of synthetic light in the pixel areas of R, G, B are approximately uniform. More specifically, according to the respective aperture ratios of the pixel areas of R, G, B determined according to the reflectances of the metal electrodes, the ratios of the reflection areas in the pixel areas are adjusted by adjusting the widths of the source lines 24.

For example, in a case where the aperture ratio of the pixel area of B is assumed to be a reference and the aperture ratio is adjusted so that the amount of synthetic light in each pixel area is 68% of the amount of synthetic light in the pixel area of B illustrated in FIG. 6, the aperture ratios (Ar, Ag) of the pixel areas of R and G after adjustment are determined by the following formulae (2) and (3).

$Ar$=aperture ratio of pixel area of $R \times |(Lb-|Lr-Lb|)/Lb|$ (2)

where the aperture ratio is 60%, Lr represents the amount of synthetic light of the pixel area of R, and Lb represents the amount of synthetic light of the pixel area of B.

$Ag$=aperture ratio of pixel area of $G \times |(Lb-|Lg-Lb|)/Lb|$ (3)

where the aperture ratio is 60%, Lg represents the amount of synthetic light of the pixel area G, and Lb represents the amount of the synthetic light of the pixel area of B)

FIG. 7A illustrates the results of adjusting the aperture ratios of the pixels of R and G by the above-described Formulae (2) and (3). As illustrated in FIG. 7A, the aperture ratios of the pixel areas of R and G after adjustment are 53% and 59%, respectively, and the light-shielding ratios thereof are 47% and 41%, respectively. Since the amounts of the reflected light of the pixel areas of R and G are determined to be 15% and 9%, respectively, by the above-described formula (1), the amounts of the synthetic light of the pixel areas of R and G are equal to that of the pixel area of B, that is, 68%.

In this case, therefore, the width Sr of the source line 24 in the pixel area of R, the width Sg of the source line 24 in the pixel area of G, and the width Sg of the source line 24 in the pixel area of B may be adjusted so that the aperture ratios of the pixel areas of R, G, B are 53%, 59%, and 60%, respectively. This allows the source lines 24 in the respective pixel areas to satisfy the relation of Sr>Sg>Sb.

In the above description, the aperture ratio of the pixel area of B illustrated in FIG. 6 (=60%) is assumed to be a reference and the aperture ratios of the pixel areas of R and G are adjusted so that the amounts of the synthetic light of the pixel areas of R and G are equal to the amount of the synthetic light of the pixel area of B, but the aperture ratio of the pixel area of G or R illustrated in FIG. 6 may be assumed to be a reference and the aperture ratios of the pixel areas of the other colors may be adjusted.

For example, in a case where the aperture ratio of the pixel area of G is assumed to be a reference and the aperture ratios of the pixel areas of R and B are adjusted so that the amounts of synthetic light in the pixel areas of R and B are 69% of the amount of synthetic light in the pixel area of G illustrated in FIG. 6, the aperture ratios (Ar, Ab) of the pixel areas of R and B after adjustment may be determined by the following formulae (4) and (5).

$$Ar = \text{aperture ratio of pixel area of } R \times (Lg - |Lr - Lg|)/Lg| \quad (4)$$

$$Ab = \text{aperture ratio of pixel area of } B \times (Lg - |Lb - Lg|)/Lg| \quad (5)$$

where the aperture ratio is 60%.

FIG. 7B illustrates the results of adjusting the aperture ratios of the pixels of R and B by the above-described Formulae (4) and (5). As illustrated in FIG. 7B, the aperture ratios of the pixel areas of R and B after adjustment are 54% and 61%, respectively, and the light-shielding ratios thereof are 46% and 39%, respectively. Since the amounts of the reflected light of the pixel areas of R and B are determined to be 15% and 8%, respectively, by the above-described formula (1), the amounts of the synthetic light of the pixel areas of R and G are equal to that of the pixel area of G, that is, 69%. In this case, therefore, the width Sr of the source line 24 in the pixel area of R, the width Sg of the source line 24 in the pixel area of G, and the width Sg of the source line 24 in the pixel area of B may be adjusted so that the aperture ratios of the pixel areas of R, G, B are 54%, 60%, 61%, respectively.

Further, for example, in a case where the aperture ratio of the pixel area of R is assumed to be a reference and the aperture ratios of the pixel areas of G and B are adjusted so that the amounts of synthetic light in the pixel areas of G and B are 75% of the amount of synthetic light in the pixel area of R illustrated in FIG. 6, the aperture ratios (Ag, Ab) of the pixel areas of G and B after adjustment may be determined by the following formulae (6) and (7).

$$Ag = \text{aperture ratio of pixel area of } G \times (Lr - |Lg - Lr|)/Lr| \quad (6)$$

$$Ab = \text{aperture ratio of pixel area of } B \times (Lr - |Lb - Lr|)/Lr| \quad (7)$$

FIG. 7C illustrates the results of adjusting the aperture ratios of the pixels of G and B by the above-described Formulae (6) and (7). As illustrated in FIG. 7C, the aperture ratios of the pixel areas of G and B after adjustment are 66% and 67%, respectively, and the light-shielding ratios thereof are 34% and 33%, respectively. Since the amounts of the reflected light of the pixel areas of G and B are determined to be 9% and 8%, respectively, by the above-described formula (1), the amounts of the synthetic light of the pixel areas of G and B are equal to that of the pixel area of R, that is, 75%. In this case, therefore, the width Sr of the source line 24 in the pixel area of R, the width Sg of the source line 24 in the pixel area of G, and the width Sb of the source line 24 in the pixel area of B may be adjusted so that the aperture ratios of the pixel areas of R, G, B are 60%, 66%, 67%, respectively.

In this way, the aperture ratio of each pixel area may be adjusted by adjusting the widths of the source lines 24 so that the amounts of the synthetic light that enters the color filters 31R, 31G, 31B in the counter substrate 11b from the respective pixel areas in the active matrix substrate 11a are approximately uniform, whereby the occurrence of such a phenomenon that an image is displayed with a hue different from the real hue thereof can be reduced.

Embodiment 2

The foregoing description of Embodiment 1 describes an exemplary case where the widths of the source lines 24 in the respective pixel areas are adjusted in the adjustment of the aperture ratios of the pixel areas of R, G, B, but the metal electrodes used in the adjustment of the aperture ratios are not limited to the source lines 24. The following description describes an example of the aspect.

Figure 8:
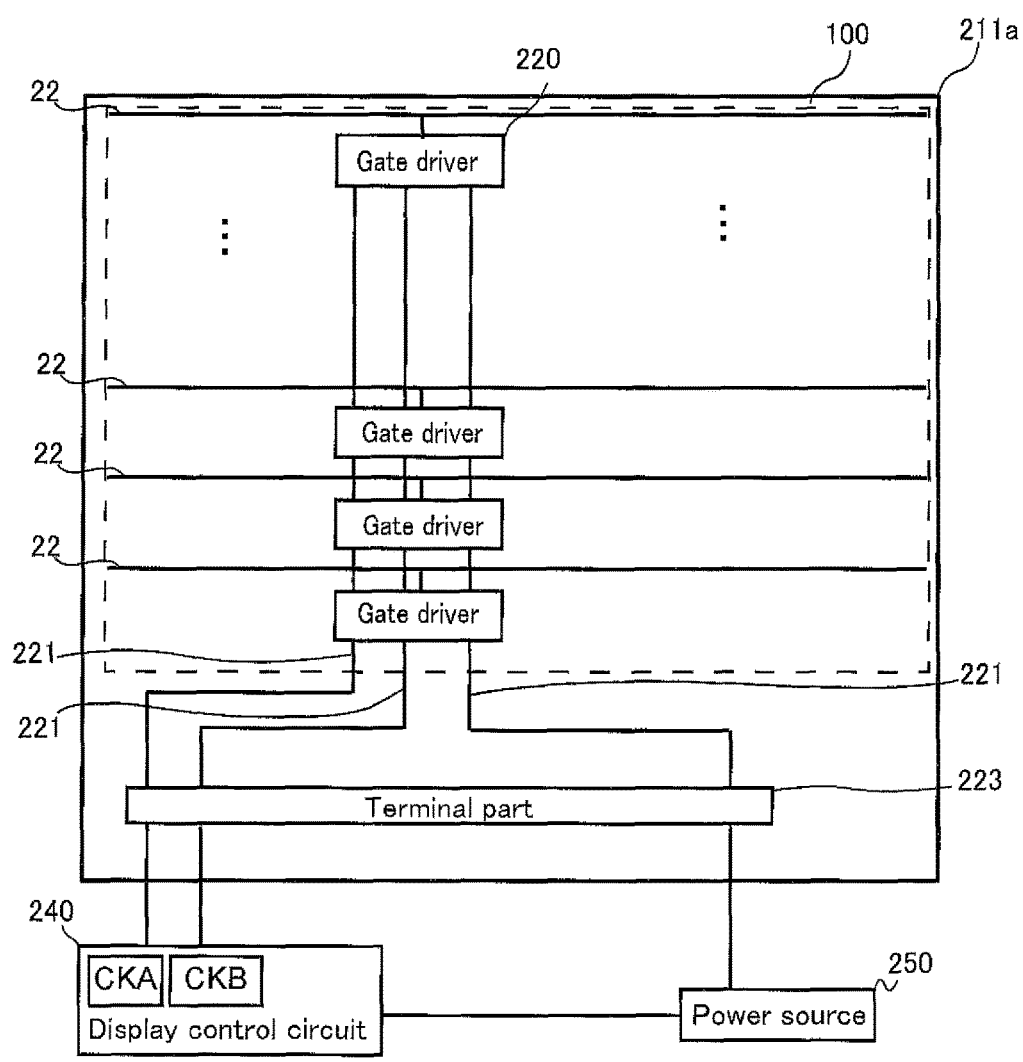
FIG. 8 is a schematic diagram illustrating a schematic configuration of the active matrix substrate in Embodiment 2.

FIG. 8 is a schematic diagram illustrating a schematic configuration of an active matrix substrate in the present embodiment. Though the illustration of the source lines 24 (see FIG. 2) is omitted for convenience sake in FIG. 8, it is assumed that a plurality of the source lines 24 are arranged so as to intersect with the gate lines 22 in the active matrix substrate 211a.

As illustrated in FIG. 8, in the present embodiment, in the display area 100 in the active matrix substrate 211a, gate drivers (driving circuits) 220 are provided in spaces between the gate lines 22. Adjacent ones of the gate drivers 220 are connected to each other via control lines 221. Further, outside the display area 100 of the active matrix substrate 211a, a terminal part 223 is provided, and the terminal part 223 is connected with each gate driver 220 via the control lines 221, and at the same time, is connected with a display control circuit 240 and a power source 250 provided outside the active matrix substrate 211a.

The display control circuit 240 supplies control signals (CKA, CKB) for driving the gate drivers 220, via the terminal part 223 to the gate drivers 220. The control signals include a signal whose potential makes a transition between an H level and a L level every one horizontal scanning period (hereinafter referred to as a clock signal), and a signal having a potential at the same level as the H level of the clock signal (hereinafter referred to as a reset signal).

The power source 250 supplies a power source voltage signal to each gate driver 220 via the display control circuit 240 and the terminal part 223. Though the illustration is omitted in this drawing, each source line 24 (see FIG. 2) in the active matrix substrate 211a is connected with the source driver, and a data signal is supplied thereto via the source driver.

The gate driver 220 outputs a voltage signal that indicates either a selected state or a non-selected state to the gate line 22 connected therewith, according to the control signal supplied thereto and the power source voltage signal. In the following description, the state where the gate line 22 is selected is referred to as "driving of the gate line 22."

Figure 9:
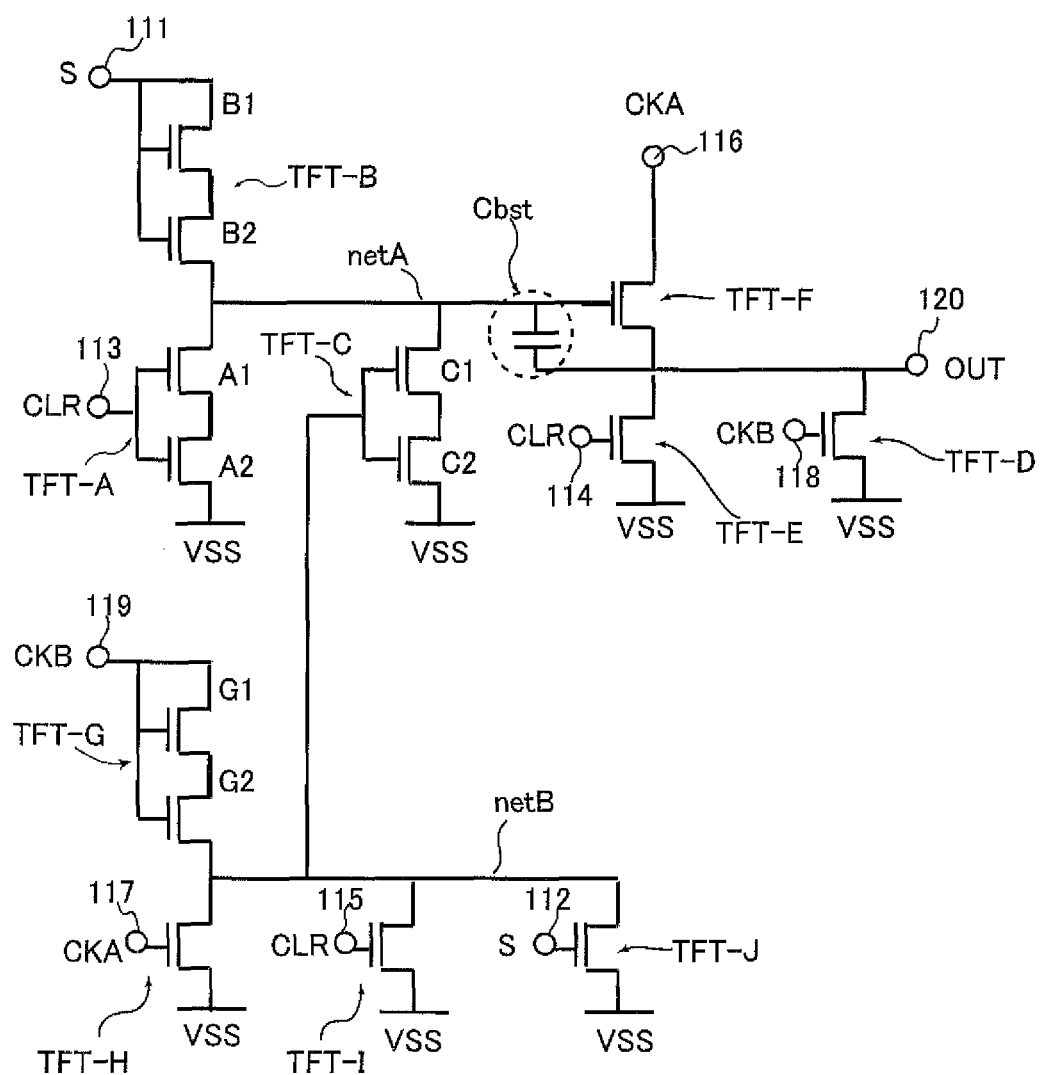
FIG. 9 illustrates an exemplary equivalent circuit of a gate driver illustrated in FIG. 8.

Here, the configuration of the gate driver 220 is described. FIG. 9 illustrates an exemplary equivalent circuit of a gate driver 220 (hereinafter referred to as a gate driver 220(n)) for driving a gate line 22(n) of an n'th stage (n: natural number, n>1).

The gate driver 220(n) includes TFTs-A to -J formed with thin film transistors (TFT) as switching elements, a capacitor Cbst, terminals 111 to 120, and a terminal group to which a low-level power source voltage signal is input.

The terminals 111, 112 receive set signals (S) via the gate line 22(n−1) of a the previous stage, i.e., the (n−1)'th stage. It should be noted that the terminals 111, 112 of the gate driver 220 connected to the gate line 22(1) of the first stage receive a gate start pulse signal (S) output from the display control circuit 240. The terminals 113 to 115 receive a reset signal (CLR) output from the display control circuit 240.

The terminals 116, 117 receive the clock signal (CKA) input thereto. The terminals 118, 119 receive the clock signal (CKB) input thereto. The terminal 120 outputs the set signal (OUT) to a gate line 22(n+1) of the subsequent stage, i.e., the (n+1)'th stage.

FIG. 9 illustrates an example of the gate driver 220(n) that drives the gate line 22(n), but in the case of the gate driver 220 of the previous stage that drives the gate line 22(n−1), the terminals 116, 117 thereof receive the clock signal (CKB), and the terminals 118, 119 of the gate driver 220 receive the clock signal (CKA). In other words, the terminals 116 and 117 as well as the terminals 118 and 119 of each gate driver 220 receive clock signals having phases opposite to those of the clock signals that the gate driver 220 of the adjacent row receives.

In FIG. 9, a line to which the source terminal of the TFT-B, the drain terminal of the TFT-A, the source terminal of the TFT-C, one of the electrodes of the capacitor Cbst, and the gate terminal of the TFT-F are connected is referred to as "netA". A line to which the gate terminal of the TFT-C, the source terminal of the TFT-G, the drain terminal of the TFT-H, the source terminal of the TFT-I, and the source terminal of the TFT-J are connected is referred to as "netB".

The TFT-A is formed with two TFTs (A1, A2) connected in series. Each gate terminal of the TFT-A is connected with the terminal 113, the drain terminal of TFT-A1 is connected with netA, and the source terminal of the TFT-A2 is connected to a power source voltage terminal VSS.

The TFT-B is formed with two TFTs (B1, B2) connected in series. Each gate terminal of the TFT-B and the drain terminal of the TFT-B1 are connected with the terminal 111 (diode connection), and the source terminal of the TFT-B2 is connected to netA.

The TFT-C is formed with two TFTs (C1, C2) connected in series. Each gate terminal of the TFT-C is connected with netB, the drain terminal of the TFT-C1 is connected with netA, and the source terminal of the TFT-C2 is connected to the power source voltage terminal VSS.

Regarding the capacitor Cbst, one of electrodes thereof is connected with netA, and the other electrode thereof is connected with the terminal 120.

Regarding the TFT-D, the gate terminal thereof is connected with the terminal 118, the drain terminal thereof is connected with the terminal 120, and the source terminal thereof is connected to the power source voltage terminal VSS.

Regarding the TFT-E, the gate terminal thereof is connected with the terminal 114, the drain terminal thereof is connected with the terminal 120, and the source terminal thereof is connected to the power source voltage terminal VSS.

Regarding the TFT-F, the gate terminal thereof is connected with netA, the drain terminal thereof is connected with the terminal 116, and the source terminal thereof is connected with the output terminal 120.

The TFT-G is formed with two TFTs (G1, G2) connected in series. Each gate terminal of the TFT-G and the drain terminal of the TFT-G1 are connected with the terminal 119 (diode connection), and the source terminal of the TFT-G2 is connected to netB.

Regarding the TFT-H, the gate terminal thereof is connected with the terminal 117, the drain terminal thereof is connected with netB, and the source terminal thereof is connected to the power source voltage terminal VSS.

Regarding the TFT-I, the gate terminal thereof is connected with the terminal 115, the drain terminal thereof is connected with netB, and the source terminal thereof is connected to the power source voltage terminal VSS.

Regarding the TFT-J, the gate terminal thereof is connected with the terminal 112, the drain terminal thereof is connected with netB, and the source terminal thereof is connected to the power source voltage terminal VSS.

In FIG. 9, an example is illustrated in which each of the TFTs-A, B, C, and G are formed with two TFTs connected in series, but it may be formed with one TFT.

(Overall Layout of Gate Driver)

Figure 10A:
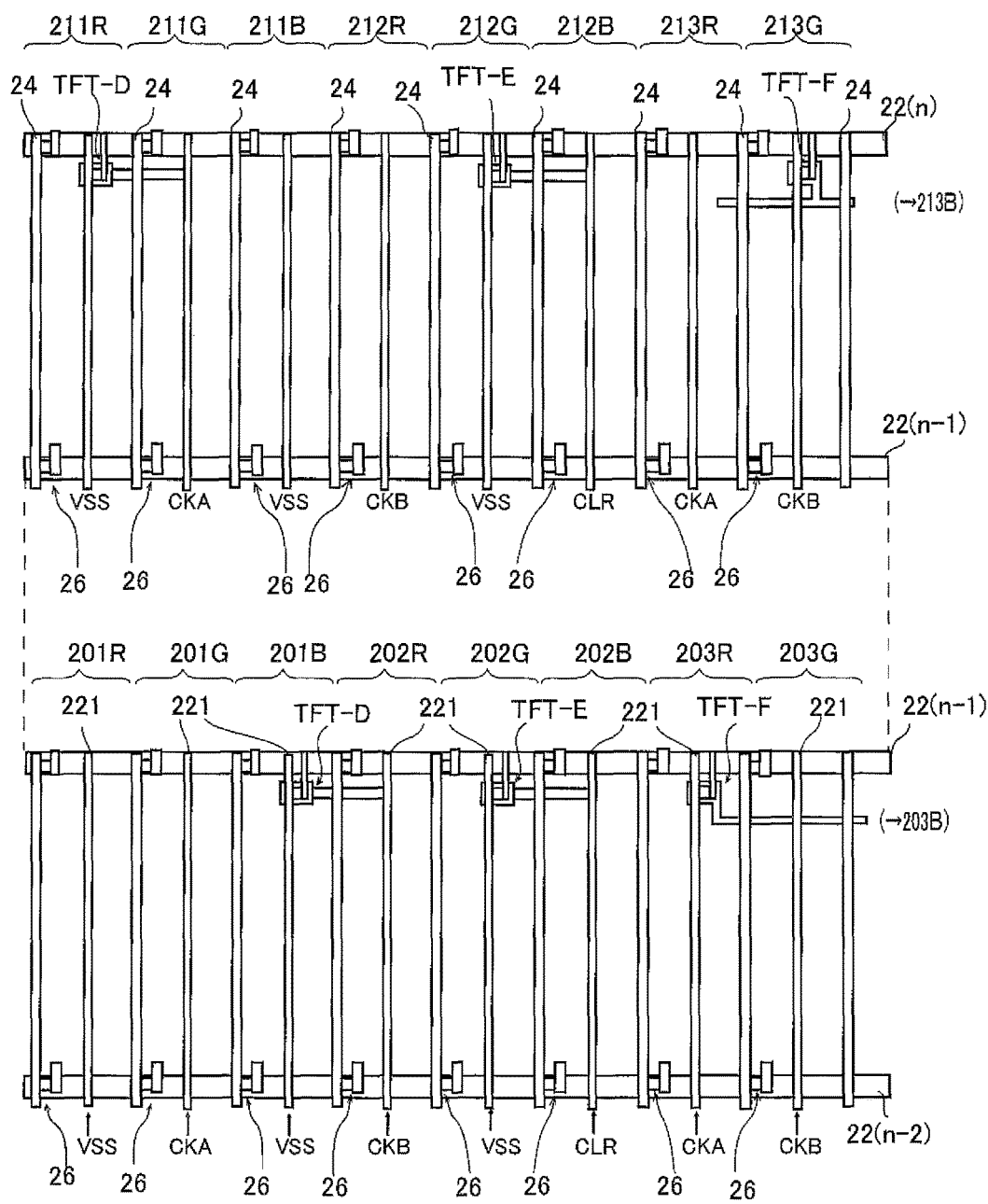
FIG. 10A is a schematic diagram illustrating an exemplary arrangement of part of elements that compose the gate driver illustrated in FIG. 9.
Figure 10B:
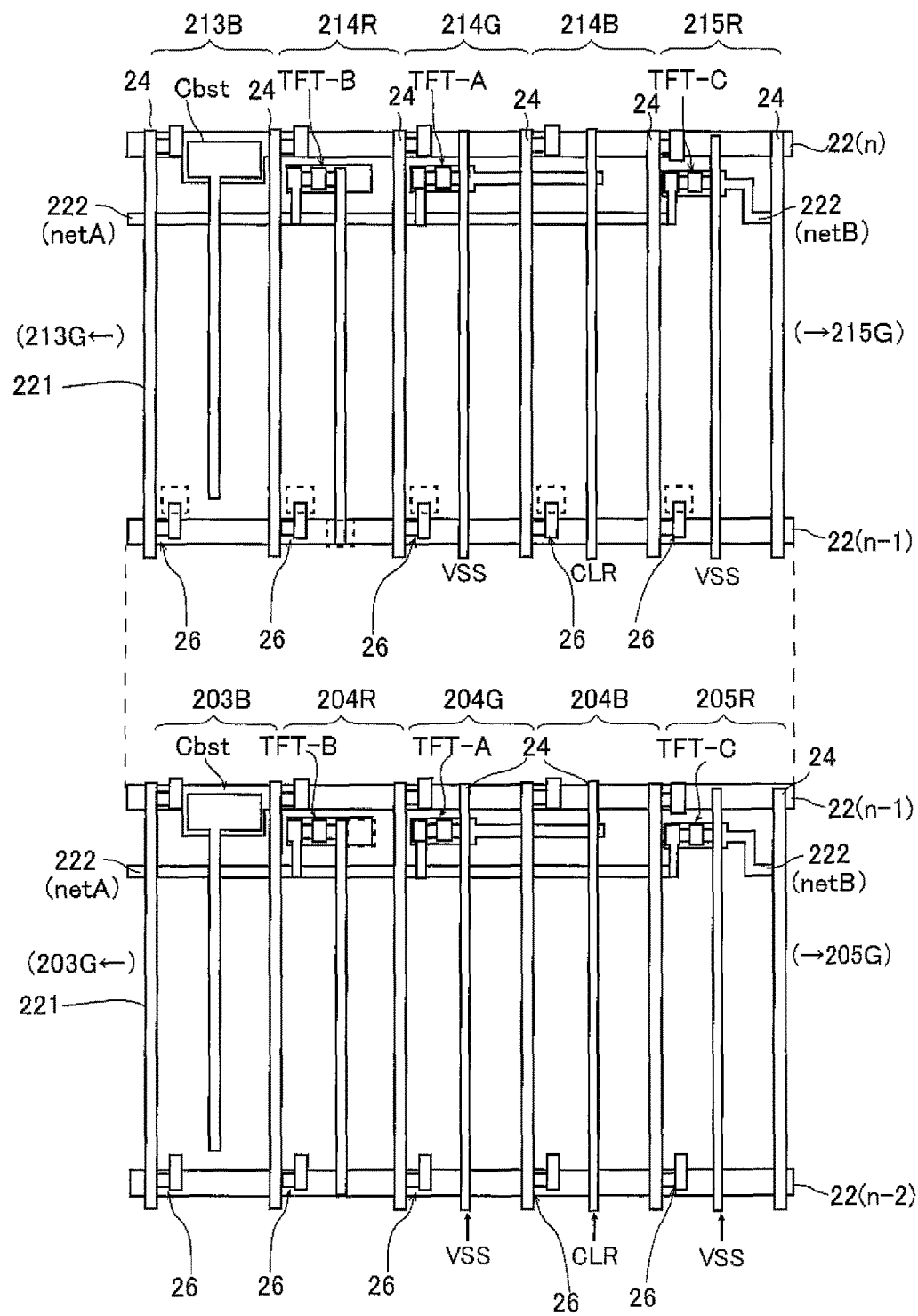
FIG. 10B is a schematic diagram illustrating an exemplary arrangement of part of elements that compose the gate driver illustrated in FIG. 9.
Figure 10C:
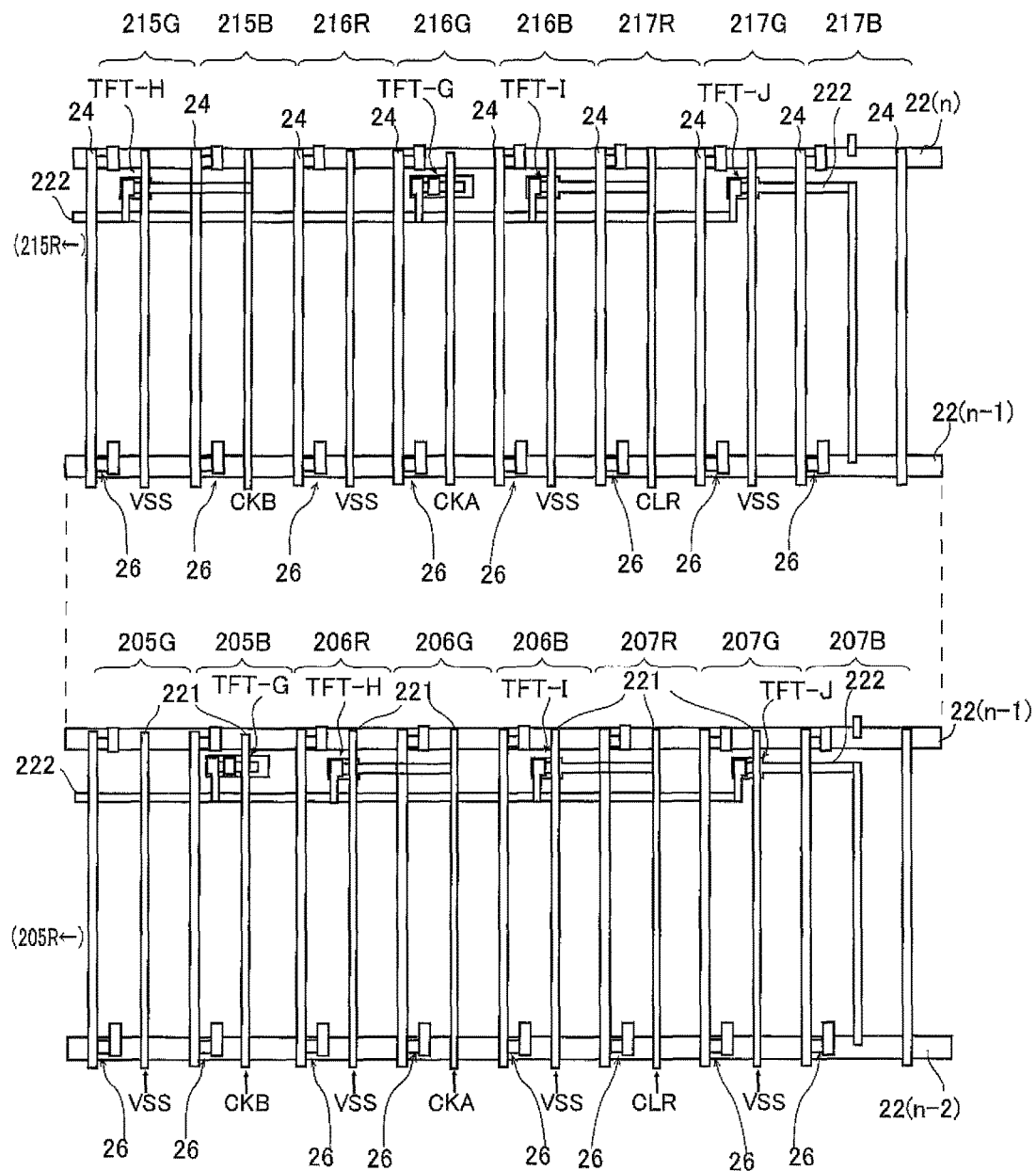
FIG. 10C is a schematic diagram illustrating an exemplary arrangement of part of elements that compose the gate driver illustrated in FIG. 9.

Next, the arrangement of respective elements of the gate driver 220 in the display area 100 is described. FIGS. 10A to 10C illustrate an example of arrangement of one gate driver 220 provided between the gate line 22(n) and the gate line 22(n−1), and between the gate line 22(n−1) and the gate line 22(n−2). In FIGS. 10A to 10C, for convenience sake, pixel areas 211R to 217B between the gate line 22(n) and the gate line 22(n−1), and pixel areas 201R to 207B between the gate line 22(n−1) and the gate line 22(n−2), are illustrated as being separate from each other, but actually they overlap each other at the gate line 22(n−1), whereby the upper and lower pixel areas are continuous. It should be noted that "R", "G", and "B" included in the reference symbols that indicate the pixel areas indicate the colors of a color filter (not shown) formed on the counter substrate 11b.

As illustrated in FIGS. 10A to 10C, in pixel areas 211R to 217B (hereinafter referred to as "upper pixel areas") and pixel areas 201R to 207B (hereinafter referred to as "lower pixel areas"), TFTs 26 for displaying images are formed in vicinities of intersections between the source lines 24 and the gate lines 22.

Besides, in the upper pixel area and the lower pixel area, elements (the TFT-A to TFT-J, and the capacitor Cbst) composing one gate driver 220 are distributedly arranged. Among these pixel areas, in a pixel area where the switching elements receiving any signal among the clock signals (CKA, CKB), the reset signal (CLR), and the power source voltage signal (the TFTs-A, C to F, H to J) are arranged, control lines 221 for supplying these signals are formed. The control lines 221 are formed over the upper pixel area and the lower pixel area so as to be approximately parallel with the source lines 24. Further, in the upper pixel area and the lower pixel area, internal lines 222 of netA and netB are formed. The internal lines 222 are formed over pixel areas in which elements (the TFTs-A to C, F, G to J, and the capacitor Cbst) that are connected to netA and netB are arranged, so as to be approximately parallel with the gate lines 22 in the upper pixel area and the lower pixel area.

In the present embodiment, the TFT-D, the TFT-F, the TFT-H, and the TFT-G, among the gate driver 220, are arranged so that the clock signals supplied thereto have phases opposite to the clock signals supplied to these TFTs of the gate driver 220 of the adjacent row, respectively. In other words, the TFT-D, the TFT-F, the TFT-H, and the TFT-G are arranged in pixel areas displaced in the horizontal direction with respect to pixel areas where these TFTs of the adjacent row are formed.

More specifically, as illustrated in FIG. 10A, while the TFT-D in the upper pixel area is formed in the pixel areas 211R and 211G, the TFT-D in the lower pixel area is formed in the pixel areas 201B and 202R. While the TFT-F in the upper pixel area is formed in the pixel area 213G, the TFT-F in the lower pixel area is formed in the pixel area 203R. Further, as illustrated in FIG. 10C, while the TFT-H in the upper pixel area is formed in the pixel areas 215G and 215B, the TFT-H in the lower pixel area is formed in the pixel areas 206R and 206G. While the TFT-G in the upper pixel area is formed in the pixel area 216G, the TFT-G in the lower pixel area is formed in the pixel area 205B. With this configuration, the clock signal (CKA) is supplied to the TFT-D in the upper pixel area, and the clock signal (CKB) having a phase opposite to that of the clock signal (CKA) is supplied to the TFT-D in the lower pixel area. Regarding the TFT-G and the TFT-H as well, clock signals having opposite phases (CKA or CKB) are supplied to the upper pixel area and the lower pixel area, respectively, as illustrated in FIGS. 10A and 10C.

Further, the TFT-B and TFT-J in the upper pixel area are connected to the gate line 22($n$−1), and the TFT-B and the TFT-J in the lower pixel area are connected to the gate line 22($n$−2). The TFT-D and the TFT-F in the upper pixel area are connected to the gate line 22($n$), and the TFT-D and TFT-F in the lower pixel area are connected to the gate line 22($n$−1). The gate driver 220 arranged in the lower pixel area receive the set signal (S) via the gate line 22($n$−2), and outputs the set signal (S) to the gate line 22($n$), thereby driving the gate line 22($n$−1). The gate driver 220 arranged in the upper pixel area receives the set signal (S) via the gate line 22($n$−1), outputs the set signal (S) to the gate line 22($n$+1), thereby driving the gate line 22($n$).

(Operation of Gate Driver 220)

Figure 11:
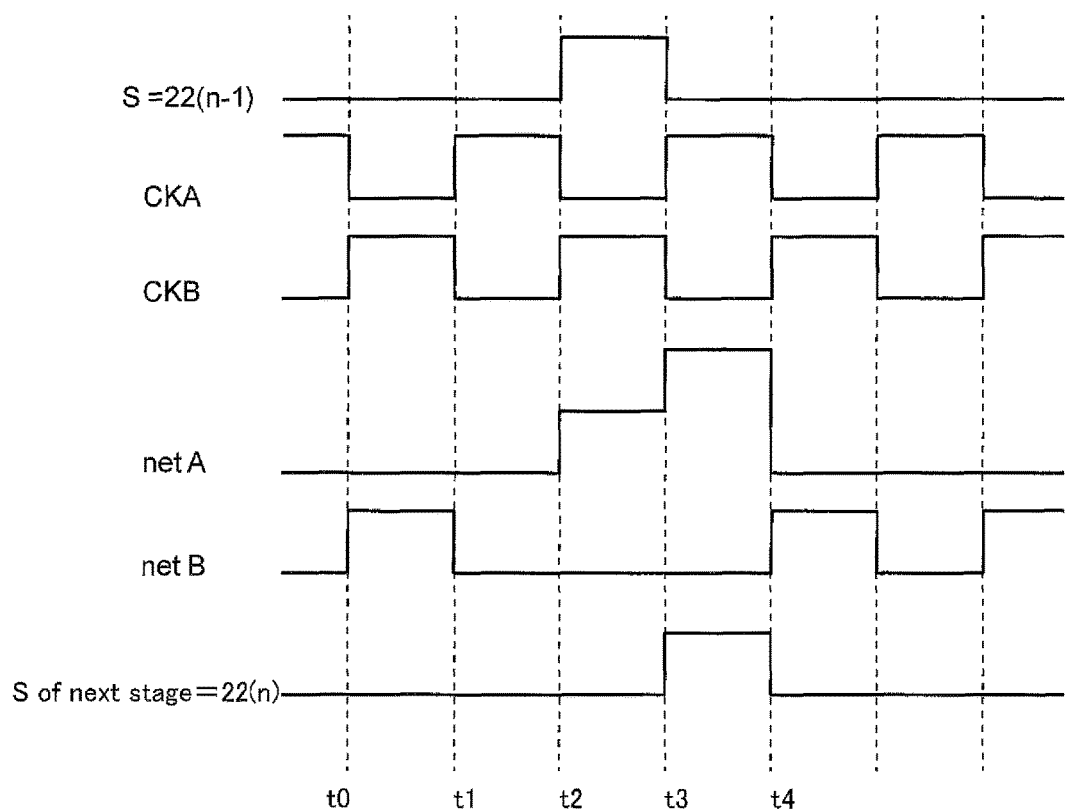
FIG. 11 is a timing chart showing an operation of the gate driver illustrated in FIG. 9.

Next, the operation of one gate driver 220 is described. FIG. 11 is a timing chart illustrating an operation of the gate driver 220 for driving the gate line 22($n$). In FIG. 11, the period from t3 to t4 is a period while the gate line 22($n$) is selected. The clock signal (CKA) and the clock signal (CKB), having phases that are inverted every horizontal scanning period, which are supplied from the display control circuit 240, are input via the terminals 116 to 119 to the gate driver 220. Further, though illustration is omitted in FIG. 11, the reset signal (CLR), which is at the H (High) level for a certain set period every perpendicular scanning period, is input from the display control circuit 4 via the terminals 113 to 115 to the gate driver 220. Upon the input of the reset signal (CLR), netA, netB, and the gate line 22 make transition to the L (Low) level.

In a period from the time t0 to the time t1, the clock signal (CKA) at the L level is input to the terminals 116, 117, and the clock signal (CKB) at the H level is input to the terminals 118, 119. This causes the TFT-G to be turned ON, and causes the TFT-H to be turned OFF, thereby causing netB to be charged to the H level. Besides, since the TFT-C and the TFT-D are turned ON and the TFT-F is turned OFF, netA is charged to the power source voltage (VSS) at the L level, whereby a potential at the L level is output from the terminal 120.

Next, at the time t1, the clock signal (CKA) shifts to the H level and the clock signal (CKB) shifts to the L level, which causes the TFT-G to be turned OFF and causes the TFT-H to be turned ON, thereby causing netB to be charged to the L level. Then, the TFT-C and the TFT-D are turned OFF, which causes the potential of netA to be maintained at the L level, whereby the potential at the L level is output from the terminal 120.

At the time t2, the clock signal (CKA) shifts to the L level, the clock signal (CKB) shifts to the H level, and the set signal (S) is input to the terminals 111, 112 via the gate line 22($n$−1). This causes the TFT-B to be turned ON, and causes netA to be charged to the H level. Further, the TFT-J is turned ON, the TFT-G is turned ON, and the TFT-H is turned OFF, which causes netB to be maintained at the L level. Since the TFT-C and the TFT-F are in the OFF state, the potential of netA is maintained without dropping. During this period, since the TFT-D is turned ON, a potential at the L level is output from the terminal 120.

At the time t3, the clock signal (CKA) shifts to the H level and the clock signal (CKB) shifts to the L level, which causes the TFT-F to be turned ON and causes the TFT-D to be turned OFF. Since the capacitor Cbst is provided between netA and the terminal 120, as the potential of the terminal 116 of the TFT-F rises, netA is accordingly charged to a potential higher than the H level of the clock signal (CKA). During this period, since the TFT-G and the TFT-J are turned OFF and the TFT-H is turned ON, the potential of netB is maintained at the L level. Since the TFT-C is in the OFF state, the potential of netA does not drop, and the potential of the H level (selection voltage) of the clock signal (CKA) is output from the terminal 120. This causes the gate line 22($n$) connected with the terminal 120 to be charged to the H level, thereby making transition to the selected state.

At the time t4, the clock signal (CKA) shifts to the L level and the clock signal (CKB) shifts to the H level, which causes the TFT-G to be turned ON and causes the TFT-H to be turned OFF, thereby causing netB to be charged to the H level. This causes the TFT-C to be turned ON and causes netA to be charged to the L level. During this period, since the TFT-D is turned ON and the TFT-F is turned OFF, a potential at the L level (non-selection voltage) is output from the terminal 120, whereby the gate line 22($n$) is charged to the L level.

In this way, the set signal (S) is output from the terminal 120 of the gate driver 220 to the gate line 22, thereby causing the gate line 22 to make transition to the selected state. The liquid crystal display device 1 sequentially drives the gate lines 22 using the gate drivers 220 connected respectively to the gate lines 22, and supplies data signals respectively to the source lines 24 using a source driver (not illustrated), thereby causing an image to be displayed on the display panel 11. The operation of the gate driver 220 is as described above.

The elements (TFT-A to TFT-J, Cbst) composing the above-described gate driver 220, the control lines 221, and the internal lines 222, as is the case with the gate lines 22 and the source lines 24, are metal electrodes obtained by laminating the metal films made of copper (Cu) and those made of titanium (Ti) and reflect light from the light source 14. The aperture ratios of the pixel areas in which the elements composing the gate drivers 220, the control lines 221, and the internal lines 222 are arranged, therefore, are lower than the aperture ratios of the other pixel areas.

In the present embodiment, the widths of the source lines 24 are made uniform in the pixel areas of R, G, B on the active matrix substrate, and on the counter substrate 11$b$, the black matrix 32 is arranged so as to have the same width as that of the source lines 24 so that the respective areas of the color filters are approximately uniform. Then, as is the case with Embodiment 1, the elements composing the gate drivers 220, and the metal lines including the control lines 221 and the internal lines 222 are arranged so that the aperture ratios of the pixel areas of R, G, B determined according to the reflectance of the metal electrodes can be achieved.

Figure 12:
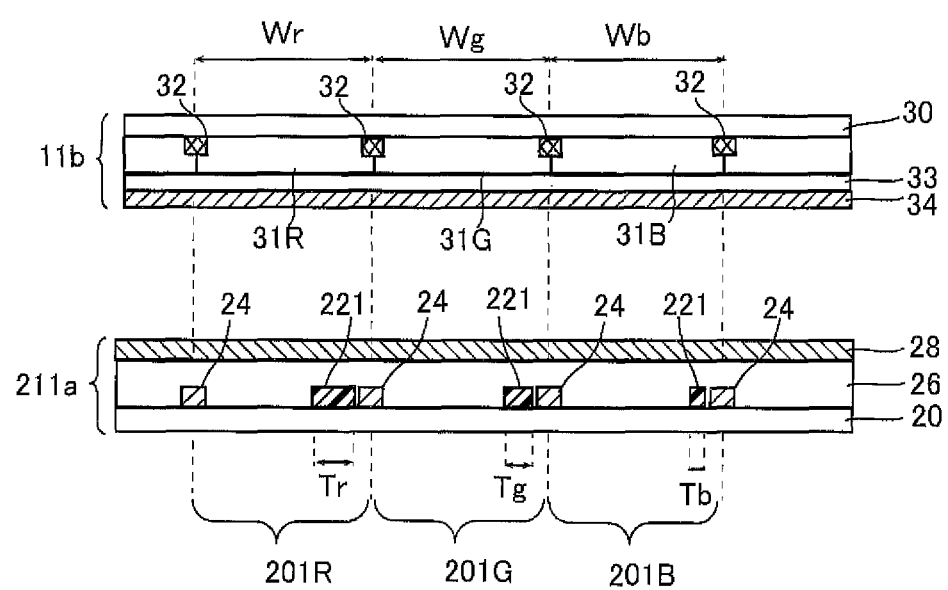
FIG. 12 is a schematic diagram illustrating a cross section of a counter substrate and an active matrix substrate in Embodiment 2.

More specifically, in accordance with the aperture ratios of the pixel areas of R, G, B determined according to the reflectances of the metal electrodes, the widths Tr, Tg, Tb of the control lines 221 arranged in the pixel areas 201R, 201G, 201B illustrated in FIG. 10A are adjusted so as to satisfy Tr>Tg>Tb, for example, as illustrated in FIG. 12. In the pixel areas where none of the elements composing the gate drivers 220, the control lines 221, and the internal line 222 is arranged, adjustment lines for adjusting the aperture ratios are arranged so that the aperture ratios determined according to the reflectances of the metal electrodes should be achieved. The adjustment lines are formed with the same metal films as those for the gate lines 22 and the source lines 24.

With this configuration, the amounts of the synthetic light passing from the pixel areas through the color filters 31R, 31G, 31B of R, G, B in the counter substrate 11b are made approximately uniform, without varying the widths of the source lines 24 in the active matrix substrate 211a, whereby the occurrence of such a phenomenon that an image is displayed with a hue different from the real hue thereof can be reduced.

Alternatively, the elements (TFT-A to TFT-J, Cbst) composing the gate driver 220, and the control lines 221, are arranged in the pixel area of R having the highest reflectance of the metal electrodes, and with use of the aperture ratio of the pixel area of R as a reference, the aperture ratios of the pixel areas of G and B may be adjusted in accordance with the amount of the synthetic light of the pixel area of R. In other words, the elements composing the gate driver 220, and the control lines 221, are arranged in the pixel area of R in such a manner that the aperture ratio of the pixel area of R is, for example, the aperture ratio of the pixel area of R illustrated in FIG. 7A. Then, the aperture ratios of the pixel areas of G and B are adjusted by providing adjustment lines in the pixel areas of G and B so that the aperture ratios of the pixel areas of G and B are, for example, the aperture ratios of the pixel areas of G and B illustrated in FIG. 7A.

With this configuration, the decrease of transmittance in the display area as a whole can be reduced, as compared with a case where any of the elements composing the gate drivers 220, the control lines 221, the internal lines 222, and the adjustment lines are arranged in each of the pixel areas of R, G, B.

The embodiments of the present invention are described above, but the above-described embodiments are merely examples for implementing the present invention. The present invention is not limited to the above-described embodiments, and can be implemented by appropriately changing or combining the above-described embodiments without departing the scope of the invention. Hereinafter, modifications of the present invention are described.

Modification Examples (1) In Embodiments 1 and 2 described above, the hue displayed may be adjusted in the following manner: after the aperture ratio of each of the pixel areas of R, G, B is adjusted, the aperture ratios of R and B are decreased, and the hue in the display panel 11 is adjusted to have a more blue tone, and the hue of the light source 14 is adjusted.

Figures 13A, 13B:
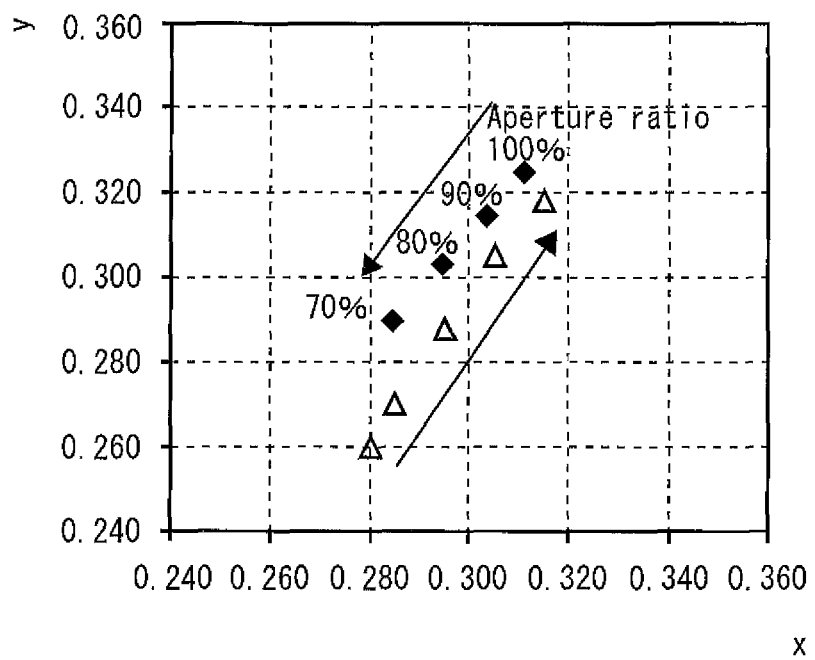
FIG. 13A illustrates color coordinates in a case where the aperture ratios of the pixel areas of R and B in Modification Example 1 are reduced, and color coordinates in a case where the hue of an LED is changed.
FIG. 13B illustrates aperture ratios of the pixel areas of R and B in Modification Example 1 and brightness values in white display.

FIG. 13A is a CIE chromaticity diagram in which color coordinates in a case where the aperture ratios of the pixel areas of R and B are changed, and color coordinates in a case where the hue of the LED is changed, are shown. FIG. 13B shows brightness values when white is displayed while the aperture ratios of the pixel areas of R and B are changed in a range from 100% to 70%.

In FIG. 13A, the marks of "♦" represent color coordinates of the display panel in a case where the aperture ratios of the pixel areas of R and B are changed in a range from 100% to 70%. Further, the marks of "A" represent color coordinates in a case where the color of the LED is changed from a color having a blue tone to a color having a yellow tone.

As illustrated in FIG. 13A, the hue has a more blue tone as the aperture ratios of the pixel areas of R and B are reduced, and as illustrated in FIG. 13B, the brightness value decreases by about 8%. As illustrated in FIG. 13A, however, as the hue of the LED approaches yellow, the improvement of the brightness can be expected. Regarding an LED, even with the same electric power consumption, light having a yellow tone provides improved brightness (increased amount of light), as compared with light having a blue tone. Therefore, even if the aperture ratios of the pixel areas of R and B are reduced, the brightness reduction in the display panel 11 can be compensated by the light source 14 by adjusting the hue of the light source 14 so that the hue to approach yellow, and this allows the electric power consumption of the light source 14 to decrease.

Figure 14:
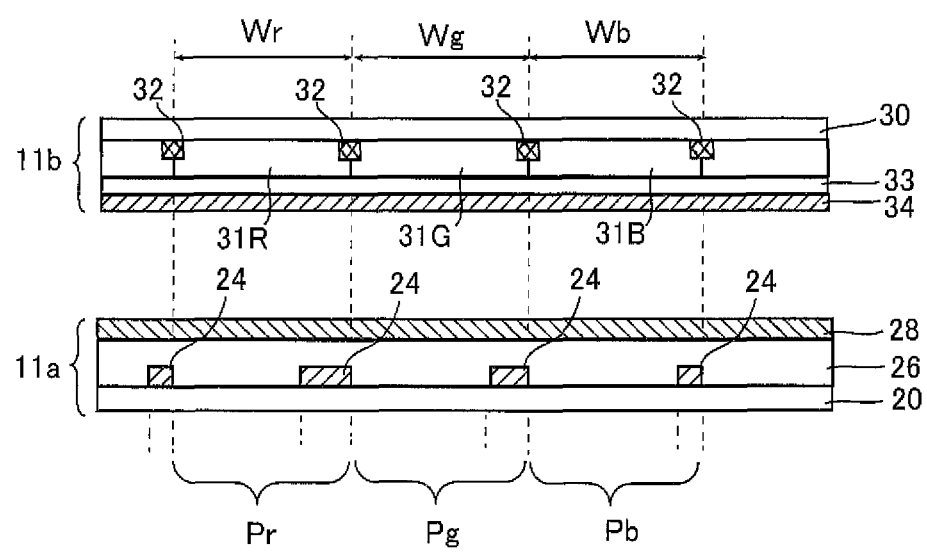
FIG. 14 is a schematic diagram illustrating a cross section of a counter substrate and an active matrix substrate in Modification Example (2).

(2) Embodiment 1 is described above with reference to an exemplary case where the width of the black matrix 32 is not uniform and the respective areas of the color filter 31R, 31G, 31B are different, but as illustrated in FIG. 14, the configuration may be such that the width of the black matrix 32 is approximately uniform and the respective areas of the color filters 31R, 31G, 31B are approximately equal.

(3) Embodiment 1 is described above with reference to an exemplary case where the aperture ratios of the pixel areas of R, G, B are adjusted by adjusting the width of the source lines 24, but the width of the gate lines 22 may be adjusted, or the respective widths of the gate lines 22 and the source lines 24 may be adjusted, according to the aperture ratios.

(4) Embodiments 1 and 2 are described above with reference to an exemplary case where the metal electrodes contain copper, and the metal electrodes of R, G, B in the respective wavelength ranges have reflectances whose magnitudes satisfy the relation of R>G>B, but the configuration and the reflection properties of the metal electrodes are not limited to these. In short, the metal electrodes are only required to contain a metal/metals that cause the reflectances in the wavelengths of R, G, B to be different. Then, according to the respective reflectances of the metal electrode in the wavelength ranges of R, G, B, the aperture ratios of the pixel areas may be adjusted so that the amounts of synthetic light that passes through the pixel areas of R, G, B are uniform.

(5) Embodiment 2 is described above with reference to an exemplary case where one gate line 22 is driven by one gate driver 220, but the configuration may be such that a plurality of gate drivers 220 for driving one gate line 22 are arranged in the display area 100.

The invention claimed is:
1. A display device, comprising:
   a display panel that includes an active matrix substrate and a counter substrate, the active matrix substrate including gate lines and source lines, as well as a plurality of pixel areas defined by the gate lines and the source lines, and the counter substrate including color filters of R (red), G (green), and B (blue) at positions corresponding to the pixel areas, respectively; and
   a reflection unit that allows light emitted from a light source to pass therethrough so as to be projected to the active matrix substrate, and reflects light from the active matrix substrate toward the active matrix substrate,
   wherein the pixel areas have reflection areas that reflect light from the reflection unit so that respective amounts of light outgoing from the pixel areas corresponding to the color filter of R (red), G (green), and B (blue) are approximately uniform.
2. The display device according to claim 1,
   wherein the source lines are provided in at least part of the reflection areas, and respective areas occupied by the source lines in the pixel areas corresponding to the color filters of R (red), G (green), and B (blue), respectively, are different from one another.

3. The display device according to claim 1 or 2, wherein the gate lines are provided in at least part of the reflection areas, and
respective areas occupied by the gate lines in the pixel areas corresponding to the color filters of R (red), G (green), and B (blue), respectively, are different from one another.

4. The display device according to claim 1, wherein the active matrix substrate further includes driving circuit units provided with respect to the gate lines, respectively, each driving circuit unit including a switching element that switches the gate line to a selected state or a non-selected state, and a control line that supplies a control signal to the switching element, and
at least either the switching elements or the control lines are provided in at least part of the reflection areas in the pixel areas corresponding to the color filters of one color among the colors of R (red), G (green), and B (blue).

5. The display device according to claim 1, wherein the active matrix substrate further includes:
driving circuit units provided with respect to the gate lines, respectively, each driving circuit unit including a switching element that switches the gate line to a selected state or a non-selected state, and a control line that supplies a control signal to the switching element; and
adjustment lines for adjusting aperture ratios of the pixel areas,
wherein at least one among the switching elements, the control lines, or the adjustment lines are provided in at least part of the reflection areas, and
in the pixel areas respectively corresponding to the color filters of R (red), G (green), and B (blue), respective areas occupied by the at least one among the switching elements, the control lines, or the adjustment lines are different from one another.

6. The display device according to claim 1, wherein at least part of the reflection areas is formed with a metal film containing copper (Cu), and
a ratio of an area occupied by the reflection area in the pixel area corresponding to the color filter of R (red) is greater than a ratio of an area occupied by the reflection area in the pixel area corresponding to the color filter of another color.

* * * * *